April 2, 1957 S. E. REA ET AL 2,787,185
EXPANSION FASTENER WITH SEALING LINER
Filed June 29, 1953 2 Sheets-Sheet 1
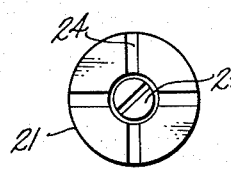
Fig. 1.
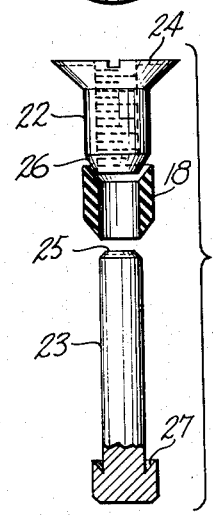
Fig. 2.
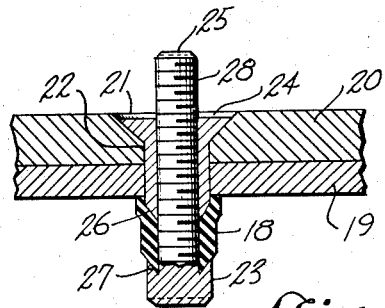
Fig. 3.
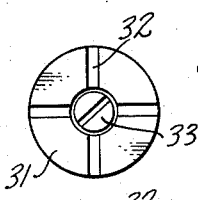
Fig. 4.
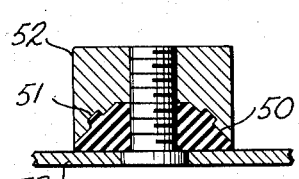
Fig. 7.
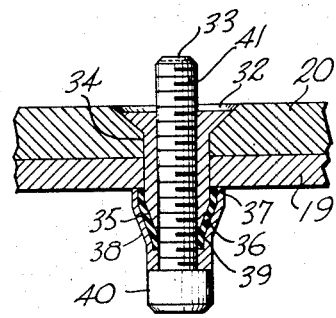
Fig. 5.
Fig. 6.
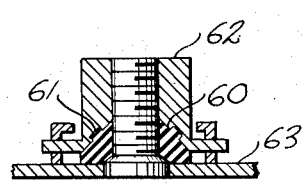
Fig. 8.
INVENTORS.
STANLEY E. REA.
KENNETH L. WILLIAMSON
BY
William E. Walter
AGENT April 2, 1957 S. E. REA ET AL 2,787,185
EXPANSION FASTENER WITH SEALING LINER
Filed June 29, 1953 2 Sheets-Sheet 2

INVENTORS.
STANLEY E. REA
KENNETH L. WILLIAMSON
BY
William B. Walter
AGENT

United States Patent Office 2,787,185
Patented Apr. 2, 1957

2,787,185

EXPANSION FASTENER WITH SEALING LINER

Stanley E. Rea and Kenneth L. Williamson, Seattle, Wash., assignors to Boeing Airplane Company, Seattle, Wash., a corporation of Delaware Application June 29, 1953, Serial No. 364,578

1 Claim. (Cl. 85—40)

This invention relates to fasteners and more particularly to fasteners used in conjunction with structures designed to be fluid tight.

The invention comprises the incorporation of sealing members into fasteners.

The purpose of the invention is to provide fasteners which function satisfactorily both as structural fasteners and as seals completely eliminating the possibility of leakage around the fastener and between the members they join together.

An object of the invention is to provide fasteners which form a seal on the fluid side of the structure.

An object of the invention is to provide fasteners that are self sealing upon installation.

The purpose and objects of the invention will become more apparent as the following detailed description is read in conjunction with the drawings in which like parts are identified by like numerals throughout the figures, where:

Figure 1 is a top view of one embodiment of the invention, a three piece blind fastener.

Figure 2 is a side elevation partially in section of the components of Figure 1 before assembly.

Figure 3 is a sectional view of the components of Figure 2 after installation joining structural members together.

Figure 4 is a top view of another embodiment of the invention, a four piece blind fastener.

Figure 5 is a side elevation partially in section of the components of Figure 4 before assembly.

Figure 6 is a sectional view of the components of Figure 5 after installation joining structural members together.

Figure 7 is a view of a nut with the sealing insert.

Figure 8 is a sectional view of a captive nut with a sealing insert.

Figure 9:
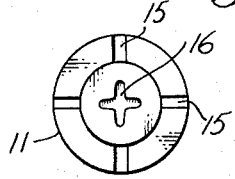
Figure 9 is a top view of another embodiment of the invention, a four-piece blind fastener.

The invention, more particularly described, comprises the incorporation of a sealant material of special properties into a fastener in such a manner that the sealant material forms a seal around the fastener on the fluid side of structure by closely fitting both the structure and the fastener.

A sealant material having special properties which are necessary to the successful employment of the designs illustrated is a commercially available product, "Nylon FM-10001," which is a thermoplastic resin. This "nylon" is chemically resistant to most fluids restricted by fluid tight structures, such as integral tank structures in aircraft that are used for storage of fuels and lubricants. It is noncorrosive and suited for molding into small parts. In addition, it is not seriously affected by temperatures within the range of —40° F. to 160° F., remaining at all times tough and strong, being capable of withstanding 10,000 p. s. i. or more.

In Figures 1, 2 and 3, a three piece countersunk blind fastener 21 is shown which uses a material having these properties. Figure 2 shows the pieces prior to their pre-assembly before placement in a countersunk hole in the members to be joined together. The nut 22 is designed to fit the countersunk hole and its inserted end 26 is beveled. The bolt 23 has a head which is recessed around the threads, and its diameter does not exceed the countersunk hole diameter. The third piece 18 is made of the sealant material moulded into a cylinder with one end recessed to fit the beveled nut end 26 and its other end chamfered for insertion into the bolt head recess 27. The inside of the sealant material 20 is not threaded and its diameter equals the outside diameter of the bolt.

These three pieces are preassembled and then inserted into place in a countersunk hole in structural members such as 19 and 20. The final assembly of this blind fastener 21 is accomplished with the aid of power or hand tools (not shown) which are fitted into the slots 24 on the nut 22 and the slot 25 on the bolt 23. The tools are used to turn the bolt 23 relative to the nut 22. As a result of the relative rotation, the bolt 23 is partially pulled back through the hole until the fastener is tight. As this occurs, the sealant material 18 is compressed to form the seal. One end of the sealant cylinder 18 overlaps the beveled nut end 26 until it abuts the surface of the inner structural member 19. The other end is controlled by and confined in the recess 27 of the bolt head. When a sealant material having the properties outlined previously is employed, the continued effectiveness of the sealed fastener is assured. The multiple notches 28 permit easy removal of the excessive length of the bolt 25.

Figures 4, 5 and 6 illustrate a fastener which is very similar to the one just described. The nut 34 is substantially the same except for a more pointed end 35. The bolt 40 likewise is similar having a slot 33 to receive a tool (not shown) and notches 41 to facilitate the removal of excessive bolt length. The sealant cylinder 36 is only slightly altered. The addition of a ductile sleeve 38, however, is the basic departure from the previous design. It is designed to slide over the bolt 40 and to receive the sealant material 36.

During the installation of the fastener both the sealant material 36 and the sleeve 38 overlap the nut end 35. The sealant material 36 is first to abut the surface of the inner structural member 19 and it immediately forms the seal. Thereafter, the ductile sleeve 38 makes contact with the structural member 19, immediately surrounding the sealant material 36. In this way, the sleeve 38 after first controlling the deformation of the sealant material 36, subsequently contacts the inner structure 19 to assume structural loads thereby relieving the sealant material 36 of its burden of carrying them. This function of the sleeve distinguishes this embodiment over that shown in Figures 1, 2 and 3. It is consequently more suitable for certain installations when greater structural loads are anticipated.

Other fastener components that utilize the excellent sealing properties of materials like and similar to "Nylon FM-10001" are illustrated in Figures 7 and 8. A standard type nut 52 with an irregular recess formed in its contacting face is illustrated in Figure 7. The sealant material 50 is formed with lugs 51 to fit the recessed nut 52. It is made oversize so it extends a little beyond the recess to make preliminary contact with the structural member 53. Also, it is threaded to form a continuous threaded hole throughout the assembled sealed nut 52.

Figure 8, like Figure 7, shows the adaptation of threaded sealant material 60 with lugs 61, to a recessed captive nut 62 that is associated with a structural member 63. Conventional bolts (not shown) are threaded into the nuts 52 and 62 and as the threaded units are drawn together the sealant material abuts the surface of the structural member and tightens itself around the threaded bolt.

Figure 11:
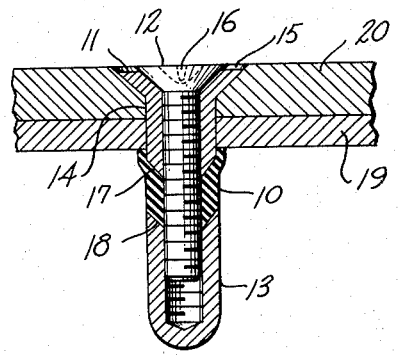
Figure 11 is a sectional view of the components of Figure 9 after installation joining structures together.
Figure 10:
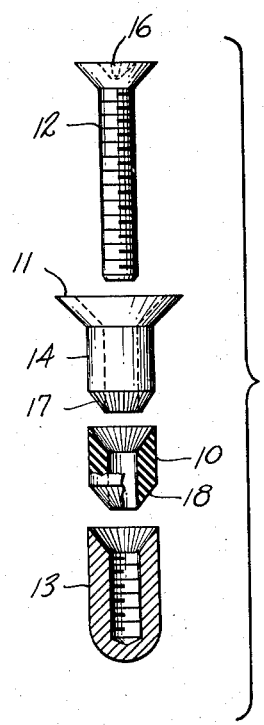
Figure 10 is a side elevation partly in section of the components of Figure 9 before assembly.

Figures 9, 10, and 11 illustrate a blind fastener utilizing the invention shown in the other figures and comprising a ductile, resilient sleeve 10 which upon tightening expands over the chamfered end of a headed sleeve 14 to flow into sheet-holding and sealing position when fully tightened.

In this form of blind fastener which is comprised essentially of a screw 12, headed sleeve 14, and nut 13, the ductile sleeve 10 serves in addition to its sealing and sheet holding functions as a nut lock. When the fastener is fully installed the resilient body of this sleeve 10 exerts a downward force on nut 13 thus loading the threads of nut and screw to increase the friction therebetween and prevent relative rotation thereof. In this embodiment, the nut is closed at its bottom to prevent leakage at the threads. Beveled surfaces 17 and 18 of nut 13, headed sleeve 14, and mating surfaces of the ductile sleeve 10 are provided with serrations or other irregularities so that when headed sleeve 14 is held fast, the nut 13 will not rotate. Because sleeve 10 is ductile its beveled surfaces may be left smooth in which case the irregular surfaces of sleeve 14 and nut will impress to engage.

As in the fasteners shown in Figures 1 through 6, headed sleeve and screw are provided with slots 15 and 16 so that the screw 12 can be turned relative to the sleeve 14.

Forms other than those shown and described may be given to our invention without deviation from its basic principle as indicated by the appended claim.

We claim:

A blind fastener for joining together structural members in a fluid tight relationship comprising an internally threaded member for insertion and partial extension through aligned holes in structural members, the nonextending portion having means limiting the insertion and preventing rotation relative to the structural members and the extending portion having a conical taper; an externally threaded member having an enlarged end greater in diameter than the threaded shank but smaller in diameter than the aligned holes and having a threaded shank extending through and beyond the internally threaded member, the extending shank end having an installation tool receiving means; and a ductile sleeve with a projecting sealant liner tightly positioned about the externally threaded member, one sleeve end abutting the enlarged end of the externally threaded member and the other sleeve end and liner end both conically tapered to override the conical tapered extending portion of the internally threaded member as the fastener is tightened so the liner abuts the structural member completing the fluid seal between the structural member and the externally threaded member.

References Cited in the file of this patent
UNITED STATES PATENTS

| | | |
|---|---|---|
| 1,937,086 | Kaplan | Nov. 28, 1933 |
| 2,099,678 | Curtis | Nov. 23, 1937 |
| 2,199,647 | Mueller et al. | May 7, 1940 |
| 2,282,711 | Eklund | May 12, 1942 |
| 2,396,005 | Gross | Mar. 5, 1946 |

FOREIGN PATENTS

| | | |
|---|---|---|
| 456,436 | Italy | Apr. 5, 1950 |